United States Patent [19]

Kim

[11] Patent Number: 4,587,112

[45] Date of Patent: May 6, 1986

[54] EFFLUENT GAS DESULFURIZATION WITH CONVERSION TO GYPSUM OF LARGE PARTICLE SIZE

[75] Inventor: Bang M. Kim, Schenectady, N.Y.

[73] Assignee: General Electric Company, Schenectady, N.Y.

[21] Appl. No.: 746,810

[22] Filed: Jun. 20, 1985

[51] Int. Cl.$^4$ .................. C01B 17/00; C01F 11/46; G01N 33/00

[52] U.S. Cl. .................. 423/242; 423/555; 436/119; 436/122

[58] Field of Search .......... 423/242 A, 242 R, 244 A, 423/244 R, 555; 436/122, 119

[56] References Cited

U.S. PATENT DOCUMENTS

| | | | |
|---|---|---|---|
| Re. 31,236 | 5/1983 | Saitoh et al. | 423/243 |
| 3,733,393 | 5/1973 | Couillaud et al. | 423/215 |
| 4,424,197 | 1/1984 | Powell et al. | 423/244 |
| 4,503,020 | 3/1985 | Weissert | 423/242 |
| 4,533,531 | 8/1985 | Shinoda et al. | 423/555 |

FOREIGN PATENT DOCUMENTS

| | | | |
|---|---|---|---|
| 5023393 | 3/1975 | Japan | 423/555 |
| 53140280 | 7/1978 | Japan | 423/555 |
| 2121776 | 1/1984 | United Kingdom | 423/555 |

*Primary Examiner*—Gregory A. Heller
*Attorney, Agent, or Firm*—William H. Pittman; James C. Davis, Jr.; James Magee, Jr.

[57] ABSTRACT

Sulfur dioxide-containing effluent gases are desulfurized by contact with a slurry consisting essentially of water, a calcium compound selected from the group consisting of calcium oxide, calcium hydroxide and calcium carbonate, and an oxidizing agent selected from the group consisting of oxygen and hydrogen peroxide. In order to convert the sulfur dioxide to calcium sulfate of maximum particle size, the slurry is analyzed for content of said oxidizing agent, which is preferably maintained at a level to provide the oxidizing equivalent of an oxygen partial pressure of about 1–50 torr therein.

13 Claims, 1 Drawing Figure

U.S. Patent May 6, 1986 4,587,112
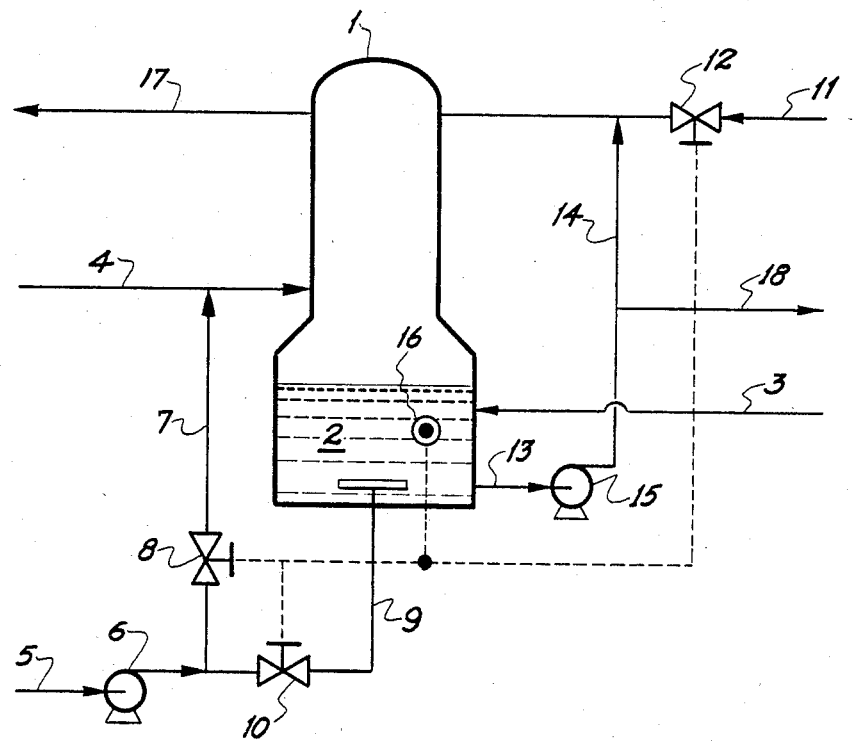

EFFLUENT GAS DESULFURIZATION WITH CONVERSION TO GYPSUM OF LARGE PARTICLE SIZE

This invention relates to the desulfurization of effluent gases, and more particularly to improvements in the efficiency of such desulfurization.

A pollution control item of increasing importance is the removal of sulfur dioxide from various industrial effluent gases. One method of sulfur dioxide removal (hereinafter denoted "desulfurization" for brevity) is to contact the effluent gas with an aqueous slurry of a calcium compound such as calcium oxide, calcium hydroxide or calcium carbonate, to produce calcium sulfite. The effectiveness of this method is substantially increased if the sulfur is oxidized from the tetravalent to the hexavalent state, thus producing calcium sulfate (gypsum) which may be easily disposed of or used for the production of wallboard and the like.

In desulfurization procedures of this type, it is frequently found that the crystals of calcium salt obtained are very small. This causes problems such as slow settling and difficulty in dewatering the crystals for efficient disposal or further use.

A principal object of the present invention, therefore, is to improve the efficiency of effluent gas desulfurization operations.

A further object is to promote the formation of large, easily separated crystals during the desulfurization process.

A still further object is to provide a highly efficient desulfurization process which involves the use of a minimum of oxidizing agent.

Other objects will in part be obvious and will in part appear hereinafter.

The present invention is based in part on the discovery that the size of the crystals produced during desulfurization is directly related to the degree of completeness of oxidation of tetravalent to hexavalent sulfur prior to crystal formation. After calcium sulfite crystals are formed, further oxidation produces relatively small gypsum crystals. This is possibly because the gypsum formed from calcium sulfite crystals has a faster rate of nucleation than crystal growth.

It has now been found that maintenance of oxidizating conditions in the slurry prevents crystallization of sulfite, thus promoting growth of gypsum crystals. On the other hand, however, the efficiency and/or cost of the desulfurization process are adversely affected when a large proportion of oxidizing agent is necessary. Oxygen (frequently in the form of air) in large quantities adversely affects efficiency, and oxidizing agents such as hydrogen peroxide are expensive and therefore provide an unfavorable cost factor when used in excess.

Accordingly, the present invention is a method for removing sulfur dioxide from effluent gas which comprises contacting said gas with a slurry initially consisting essentially of water, at least one calcium compound selected from the group consisting of calcium oxide, calcium hydroxide and calcium carbonate and at least one oxidizing agent selected from the group consisting of oxygen and hydrogen peroxide, in amounts to convert said sulfur dioxide to calcium sulfate, and analyzing said slurry for content of said oxidizing agent so as to promote conversion of said sulfur dioxide to calcium sulfate of maximum crystal size.

The effluent gases which may be desulfurized according to the method of this invention are of types known to those skilled in the art. They include stack and flue gases from power-producing combustion operations and effluent gases from metal sulfide ore roasting operations. In general, any effluent gas containing a substantial proportion of sulfur dioxide may be desulfurized in accordance with the invention.

The essential desulfurization step in the method of the invention is effected by contacting the effluent gas with an aqueous slurry of at least one calcium compound. Suitable calcium compounds are calcium oxide, calcium hydroxide and calcium carbonate, all of which react essentially quantitatively with sulfur dioxide to produce calcium sulfite or, under oxidative conditions as in the present invention, gypsum.

Because of its availability and relative low cost, calcium carbonate is preferred as the calcium-containing component of the slurry. Calcium carbonate is usually furnished in the form of limestone, and any of several grades of limestone may be used in the method of this invention. By way of illustration and not limitation, suitable limestones include continental limestone such as "Fredonia" limestone from Fredonia, Ky.; "Thomasville" limestone from Thomasville Company in Pennsylvania; and products obtainable from the C-B Chrystal Company of New Jersey. A particular advantage of the invention is its adaptability for operation with relatively low-purity limestones such as "aragonite", which is formed from sea water as a limestone sand.

In addition to water and the calcium compound, the slurry contains at least one oxidizing agent selected from the group consisting of oxygen (which may be furnished by air) and hydrogen peroxide, the purpose of which is to oxidize tetravalent to hexavalent sulfur and produce gypsum which may be easily disposed of, either by discarding or by recovering for further use. Aside from water, the calcium compound and the oxidizing agent are the only materials initially present which make a substantial contribution to the operation of the invention. That is, the slurry initially consists essentially of water, the calcium compound and the oxidizing agent. As it is used, of course, calcium sulfate is formed in increasing quantities.

The proportion of calcium compound in the slurry is not critical but may be adjusted over a wide range according to principles known in the art. In general, the concentration of the calcium compound may correspond to about 1–25% (by weight) calcium carbonate.

In order to promote the formation of large, easily recovered gypsum crystals, it has been found essential to maintain a concentration of oxidizing agent sufficient to oxidize substantially all the tetravalent sulfur to hexavalent sulfur prior to precipitation. This is true because crystalline gypsum formed by oxidation of calcium sulfite crystals has a small particle size. On the other hand, gypsum produced by a method which includes sulfite oxidation prior to crystallization has a large particle size and is substantially easier to handle.

The proportion of oxidizing agent should therefore be high enough to achieve complete oxidation of sulfite prior to crystallization. It will depend on various parameters such as type of limestone employed and sulfur dioxide concentration in the effluent gas being treated, and can readily be determined by experimentation. In general, a proportion sufficient to provide the oxidizing equivalent of an oxygen partial pressure of about 1–50 torr in the slurry is effective. If the concentration is too low, oxidation to hexavalent sulfur may be incomplete, resulting in formation of undesirably small crystals. Substantially higher concentrations afford virtually no advantages and can be detrimental to the efficiency of the desulfurization operation and unnecessarily increase costs.

The concentration of oxidizing agent in the slurry may be determined by known analytical techniques using conventional detection means. An illustration of such a technique is the use of an oxygen sensing cell of known design to determine proportion of dissolved oxygen. A suitable cell of this type is disclosed in Willard et al., *Instrumental Methods Of Analysis*, Fourth Edition (1967), p. 693, and said disclosure is incorporated by reference herein. Despite the statement therein that sulfur dioxide interferes with the operation of the cell, it has been found that the results of its use are adequate for the purposes of this invention, whether the oxidizing agent is oxygen, hydrogen peroxide or both.

It is within the scope of the invention to introduce oxygen either by sparging into the slurry or by adding it to the effluent gas being treated prior to the contact of said gas with the slurry. The latter means may often be preferred because of its relative simplicity and use of a minimum of equipment.

In a preferred embodiment of the invention, the oxidizing agent detection means is controllably connected in known manner to metering means therefor. In this way, the amount of said oxidizing agent which is introduced may be made to depend directly on its measured concentration in the slurry. For example, the oxygen sensing cell may be controllably connected to one or more valves regulating the flow of oxygen and/or hydrogen peroxide into the system.

The effect of the presence of oxidizing agent on crystal growth has been shown by a series of experiments in which mixtures of sulfur dioxide, oxygen and nitrogen were bubbled through aqueous slurries of 10% (by weight) of various grades of limestone and 2% gypsum seed crystals, with limestone added as necessary to maintain a constant pH. At 2000 ppm. of $SO_2$ and 5% oxygen in the gas mixture, large gypsum crystals, uncontaminated by calcium sulfite, were obtained by the use of either Thomasville limestone or aragonite. At 2% oxygen, large gypsum crystals were obtained using Thomasville limestone but the aragonite product comprised small crystals highly contaminated with sulfite, and at 0.8% oxygen substantial amounts of such sulfite and small crystals were obtained from both types of limestone. In a similar experiment in which oxygen was present at 0.8% and hydrogen peroxide was added to the slurry at a concentration of 2% by weight prior to introduction of the gas mixture, large gypsum crystals were also obtained.

Reference is now made to the drawing which depicts an illustrative apparatus for carrying out the method of the invention. The process is carried out in vessel 1 which contains an aqueous limestone slurry 2. The water and limestone may be fed through separate ports or, as indicated, as a slurry via inlet port 3. Effluent gas is introduced at 4, and air or oxygen is pumped in through line 5 by pump 6. It may be merged with effluent gas 4 through line 7 controlled by valve 8, sparged directly into the slurry through line 9 controlled by valve 10, or both. If hydrogen peroxide is used, it is fed into vessel 1 through line 11 via valve 12, preferably with dilution by slurry recirculated through lines 13 and 14 by pump 15.

The concentration of the oxidizing agent in the slurry is monitored by sensing means 16, illustrated as an oxygen sensing cell. It may be connected as shown to any of valves 8, 10 and 12, thereby controlling the amount of oxidizing agent introduced into the system. The desulfurized gas exits the system via line 17, and gypsum slurry 2 may be removed through lines 15 and 18 via pump 15 for dewatering and disposal.

The invention offers a simple means for operating an effluent gas desulfurization system on a continuous basis, with monitoring means available to ensure that adequate oxidizing agent is provided without using an unnecessary amount thereof. At the same time, it results in the recovery of gypsum crystals of maximum size, adapted for easy dewatering for disposal or further use.

What is claimed is:

1. A method for removing sulfur dioxide from effluent gas which comprises contacting said gas with a slurry initially consisting essentially of water, at least one calcium compound selected from the group consisting of calcium oxide, calcium hydroxide and calcium carbonate and at least one oxidizing agent selected from the group consisting of oxygen and hydrogen peroxide, in amounts to convert said sulfur dioxide to calcium sulfate, and analyzing said slurry for content of said oxidizing agent so as to promotoe conversion of said sulfur dioxide to calcium sulfate of maximum crystal size.

2. A method according to claim 1 wherein the calcium compound is calcium carbonate.

3. A method according to claim 2 wherein oxygen is the only oxidizing agent.

4. A method according to claim 3 wherein the calcium carbonate is aragonite.

5. A method according to claim 4 wherein said oxygen is added to the effluent gas prior to its contact with said slurry.

6. A method according to claim 4 wherein the oxygen content of the slurry is analyzed by detection means controllably connected to metering means for oxygen introduction.

7. A method according to claim 6 wherein the oxygen content of the slurry is analyzed by an oxygen sensing cell.

8. A method according to claim 7 wherein the amount of oxygen is sufficient to provide an oxygen partial pressure of about 1–50 torr in said slurry.

9. A method according to claim 2 wherein the oxidizing agent includes hydrogen peroxide.

10. A method according to claim 7 wherein the calcium carbonate is aragonite.

11. A method according to claim 10 wherein the oxidizing agent content of the slurry is analyzed by detection means controllably connected to metering means for introduction of oxidizing agent.

12. A method according to claim 11 wherein the oxidizing agent content is analyzed by an oxygen sensing cell.

13. A method according to claim 12 wherein the amount of oxidizing agent is sufficient to provide the oxidizing equivalent of an oxygen partial pressure of about 1–50 torr in said slurry.

* * * * *